Sept. 22, 1964 D. W. HAGELBARGER 3,149,901
RECORDER
Filed Nov. 17, 1960 2 Sheets-Sheet 1

INVENTOR
D. W. HAGELBARGER
BY Kenneth B. Hamlin
ATTORNEY

Sept. 22, 1964 D. W. HAGELBARGER 3,149,901

RECORDER

Filed Nov. 17, 1960 2 Sheets-Sheet 2

INVENTOR
D. W. HAGELBARGER
BY Kenneth B. Hamlin
ATTORNEY

United States Patent Office
3,149,901
Patented Sept. 22, 1964

3,149,901
RECORDER

David W. Hagelbarger, Morris Township, Morris County, N.J., assignor to Bell Telephone Laboratories, Incorporated, New York, N.Y., a corporation of New York Filed Nov. 17, 1960, Ser. No. 69,871
9 Claims. (Cl. 346—77)

This invention relates to recorders and, more particularly, to new and improved devices for recording indicia.

The several recording techniques currently used in data processing and associated arts are limited either inherently or by the type of recording medium used. The photographic technique utilize a photosensitive recording material which is expensive and requires chemical processing. Difficulties in the control of extraneous light are also encountered. Those systems using a magnetic recording method also require an expensive and specially prepared recording medium and, in general, involve additional apparatus to interpret the recorded information.

Some direct recording methods employ recording media which are subject to light damage and are perishable. Such devices are limited in the rate at which information can be recorded and require additional processes to make the recorded information permanently available. Examples of such techniques are found in electrochemical, electrographic, and electrostatic recording systems.

Most mechanical direct recording methods have the distinct advantage of providing a legible record without additional reading apparatus or developing processes. Numerous marking methods, such as mechanical pens, ink vapor sprays, and pressure printing devices, using a carbon paper behind a plain paper, have been tried. Heretofore several disadvantages have existed in recording systems of this type, such as limitation of recording speed due to the inertia of inherent mechanical linkage, a tendency to tear the recording medium under high speed operation, excessive stylus wear, and the tendency of the marking element to bounce or vibrate when operated at high speeds.

It is, therefore, a general object of this invention to increase the speed at which indicia may be directly recorded.

Another object of this invention is to directly record indicia at high speed on a substantially stable, economical recording medium.

A further object of this invention is to record indicia at high speed in a manner which requires no additional processes or apparatus for reading.

A still further object of this invention is to extend the life of a marking element utilized in direct recording systems.

These and other objects of the present invention are attained in illustrative embodiments wherein a spherical marking element comprises a movable portion of a magnetic flux loop defined by a magnetic core structure. The marking element is so positioned that, responsive to a magnetic flux induced into the core structure, it is magnetically urged into marking contact with a recording medium. The marking element is moved, by the induced flux, into a position presenting a minimum reluctance.

It is a feature of this invention that a marking element be so movably positioned in relation to a magnetic core structure that the magnetic path of least reluctance in the core structure passes through the marking element.

It is a further feature of this invention that a marking element be so movably positioned in relation to a magnetic core structure that the magnetic field strength is increased by a specific relative movement between the marking element and the magnetic core structure.

It is another feature of this invention that a magnetic flux loop, comprising a movable marking element and two core members, be so configured that the magnetic field intensity between the marking element and one core member remains substantially unchanged during relative motion therebetween.

It is a still further feature of this invention that a marking element comprises a movable portion of a magnetic flux loop defined by a magnetic core structure, the marking element being so positioned that, responsive to a magnetic flux induced in the core structure, it is magnetically urged into marking contact with a recording medium.

It is still another feature of this invention that a marking element be magnetically maintained in direct contact with a recording medium to reduce travel distance, thereby shortening its transit time to facilitate high speed operation and eliminate vibration.

A still further feature of this invention is a movable marking element of circular cross-section applied in a rolling manner to a recording medium to minimize friction therebetween.

These and other objects and features of this invention will be more fully apprehended from an initial description of the principles of operation and subsequent consideration of the various illustrative embodiments of the invention as shown in the drawings, in which.

Figure 1:
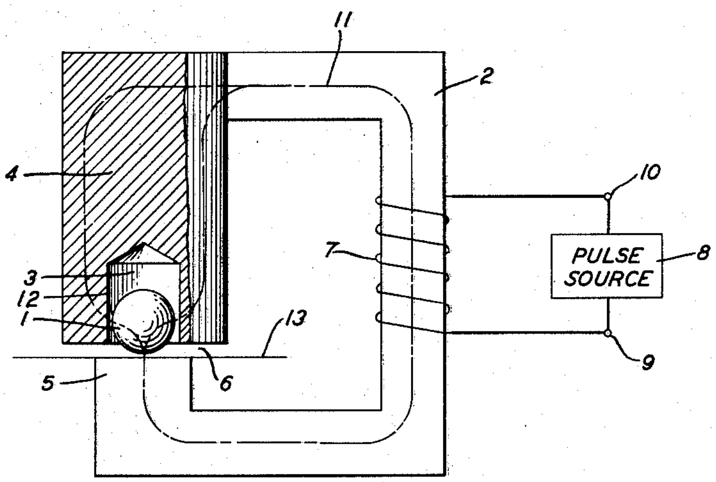
FIG. 1 depicts in schematic representation the principles of operation of the present invention.

Referring to FIG. 1, which is a simplified schematic diagram illustrating the principles of operation of the present invention, a spherical magnetic marking element 1 is movably positioned in a magnetic core structure 2 by means of a central cylindrical cavity 3. The core 2 comprises a core member 4 and a core member 5 spaced as shown in the drawing to define an air gap 6. A winding 7 is inductively coupled to the core 2, and an electrical pulse source 8 is connected across terminals 9 and 10 respectively of the winding 7. Positioned in air gap 6 is a pressure sensitive recording medium 13.

Magnetic flux, induced into core 2 by an electrical signal from the pulse source 8, forms a plurality of closed flux loops of which a loop 11 is typical. The marking element 1 protrudes into the gap 6 so that the magnetic reluctance presented to the flux traversing gap 6 by means of the marking element 1 is substantially less than the reluctance presented to the flux by the air gap 6 itself. Therefore, in traversing the gap 6, the great majority of induced flux passes through the marking element 1.

In accordance with one feature of the invention, a comparatively constant geometric relationship exists between the spherical marking element 1 and a wall 12 of the cavity 3 as marking element 1 is moved toward the core member 5. Due to their concurrently concentric and substantially tangential inter-relationship the intensity of the magnetic field between the marking element 1 and the cavity wall 12 remains comparatively unchanged. As is well known, the force acting on a magnetic object in a magnetic field is a function of the resultant change in field intensity due to a movement of the object. Therefore, the marking element 1 is subjected to substantially no inhibiting magnetic forces preventing its movement toward core member 5.

The strongest part of the magnetic field produced by the induced flux is located between the marking element 1 and the core member 5 due to the high flux concentration in the space therebetween. Therefore, the marking element 1, as a free moving magnetic body in a magnetic field, is forced towards the stronger part of the field, or towards core member 5.

As the marking element 1 moves towards the core member 5 a considerable change in magnetic field intensity will occur therebetween due to the further increased flux concentration. A force of increasing magnitude will, therefore, be exerted on the marking element 1 further urging it toward the core member 5.

In accordance with a further aspect of the present invention the marking element 1 is forced toward the core member 5 in response to a signal from the pulse source 8, and is impressed on the recording medium 13 making a mark thereon, representative of the applied signal.

Figure 2:
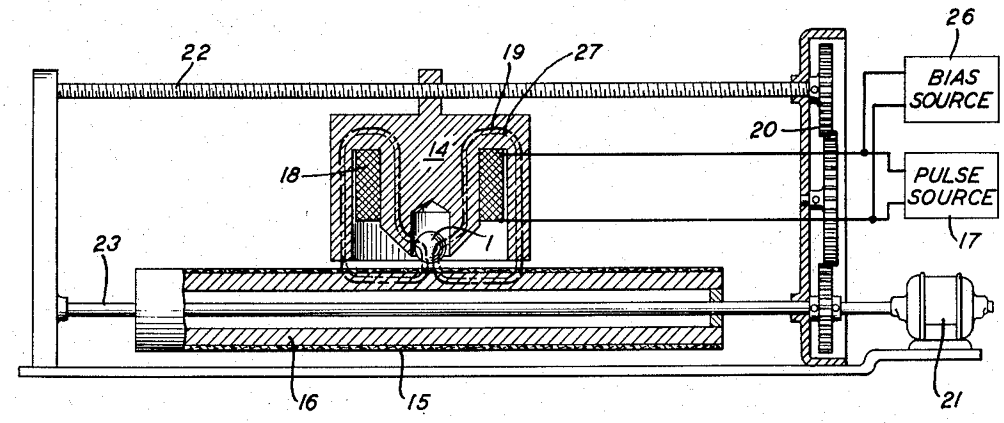
FIG. 2 depicts in cross-section an illustrative embodiment of this invention for recording indicia on a recording medium on a rotating drum.

FIG. 2 shows an illustrative embodiment of this invention which comprises a spherical magnetic marking element 1, movably positioned in a magnetic core structure 14. A cylindrical drum 16 of magnetic material, with a pressure sensitive recording medium 15 mounted thereon is juxtaposed with the marking element 1. An electrical signal applied by a pulse source 17 to a winding 18, inductively coupled to the core 14, includes a plurality of flux loops into the core 14 of which a loop 19 is typical.

The core 14 is tapered outwardly and away from the surface of the drum 16. The resulting conical shape of the core 14 reduces flux leakage between the core 14 and the drum 16 thereby increasing the flux concentration between the marking element 1 and the drum 16 and strengthening the magnetic field therebetween.

A drive mechanism 20 actuated by a synchronous motor 21 rotates drum 16 and, by operation of a lead screw 22, moves the core 14 containing marking element 1 along the recording medium 15 mounted on drum 16 in a direction parallel to its axis of rotation, as represented by a shaft 23. As the marking element 1 is moved with respect to the recording medium 15 a space-time relationship is established. The pulse source 17 applies electrical signals, within this space-time relationship, to the winding 18. The magnetic flux induced in core 14 by each of the applied signals produces a magnetic field whose intensity is so distributed that marking element 1 is forced against recording medium 15 with sufficient force to make a representative mark thereon. Thus, the marking element 1, magnetically modulated by electrical signals from pulse source 17, establishes on the recording medium a representative pattern of indicia.

A bias source 26 applies a constant electrical current to the winding 18. This current is of a predetermined magnitude less than that of the electrical signals applied by the pulse source 17. The biasing current is of sufficient strength to induce a flux 27 into the core 14 producing a force large enough to urge the marking element 1 into contact with medium 15. However, the pressure exerted by the element 1, as a result of this force, is insufficient to cause a mark to be made on the medium 15.

In keeping with another feature of the instant invention, this biasing pressure minimizes the distance traveled by the marking element 1 between marking signals from source 17, thereby allowing an increase in frequency of marking signal application and substantially eliminating errors and false recording due to undue bouncing of the marking element 1.

As a result of the constant contact of the marking element 1 with the recording medium 15, a rolling action is imparted to the spherical marking element 1 by movement of the recording medium 15, thereby presenting to medium 15 a substantially different marking face of the marking element 1 for each marking signal. The useful life of the marking element 1 is, therefore, extended by uniformly distributing the wear due to friction over the entire surface area of the marking element 1. Another advantage provided by this rolling action is a reduction in the tendency of a marking element to tear or otherwise mutilate a recording medium when forcibly applied thereto.

An advantageous application of the illustrative embodiment of the present invention, shown in FIG. 2 is in the facsimile art where pulse source 17 is representative of a source of fascimile signals.

Figure 3:
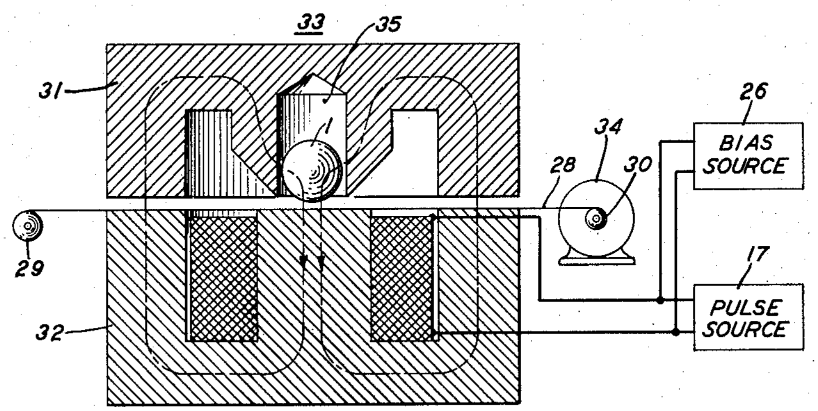
FIG. 3 depicts a cross-sectional view of a further embodiment of the present invention for recording indicia on tape.

Another embodiment of the invention is illustrated by FIG. 3 in which a pressure sensitive recording tape 28, such as a plain paper tape with a carbon paper backing, is wound on spools 29 and 30 and passed between core members 31 and 32 of a magnetic core structure 33. A spherical recording element 1 is movably positioned in a cylindrical cavity 35 in core member 31 in juxtaposition with the tape 28. A bias source 26 and a pulse source 17 modulate the marking element 1 in a manner similar to that discussed in consideration of FIG. 2. Rotation of the spool 30 by a synchronous motor 34 causes the tape 28 to move with respect to the marking element 1, thereby creating a space-time relationship. Thus, a pattern of indicia, representing information signals applied within this space-time relationship by the pulse source 17, is recorded on the tape 28. This embodiment may be advantageously utilized in the data processing art.

A rotating motion may advantageously be imparted to either of the core members by those skilled in the art. The flexibility of winding location, as illustrated in the above-described embodiments, precludes the requirement of slip-rings in applying bias current and signal pulses to the core structure. The winding may be placed on that core member which is not required to rotate.

Figure 4:
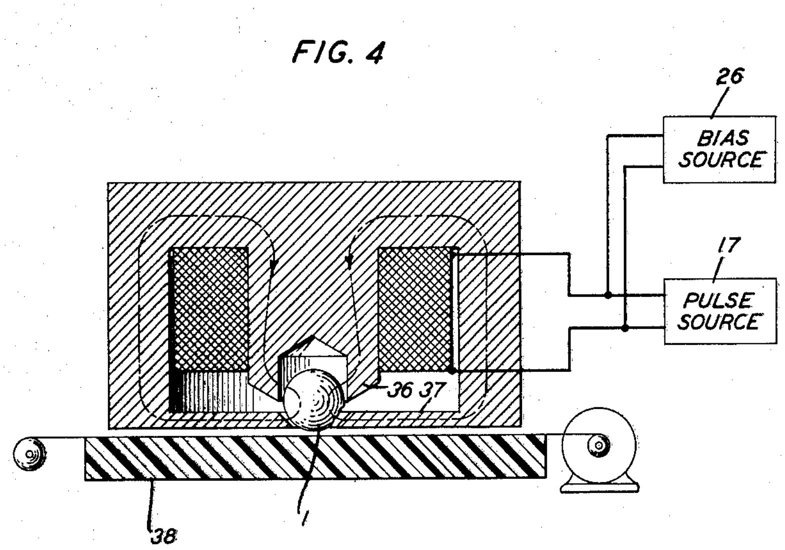
FIG. 4 shows another embodiment of the present invention.

FIG. 4 shows still another illustrative embodiment of this invention in which the mode of operation is similar to that discussed in consideration of FIG. 3. The magnetic inter-relationship of core members 36 and 37 and marking element 1 is the functional equivalent of that between core members 4 and 5 and marking element 1 as described in consideration of FIG. 1. However, the recording tape 28 is passed between the core structure and a platen 38 rather than between core members as hereinbefore described. An advantage of this embodiment is that platen 38 does not necessarily have to be of a magnetic material.

In the operation of all embodiments of the present invention disclosed herein, recording occurs when a spherical marking element is forced against a pressure sensitive recording medium. However, this invention may be advantageously used with recording media of other types by those skilled in the art. The marking element may also be varied in shape without substantially changing the magnetic relationships herein described. Such variations as a cylindrical marking element and other elements of circular and annular cross-section may be advantageously utilized in the present invention by those skilled in the art.

It is also to be understood that the above-described arrangements are illustrative of the application of the principles of the present invention. Numerous other arrangements may be devised by those skilled in the art without departing from the spirit and scope of the invention.

What is claimed is:

1. In a recorder, a marking device comprising, in combination, a magnetic core structure having a cavity therein, a mechanically independent spherical marking element movably positioned and freely rotatable in said cavity and in flux connecting relationship with said core structure, means for positioning a recording medium adjacent said marking element, and means for selectively moving said marking element into contact with said recording medium, said moving means comprising means for inducing magnetic flux into said core structure.

2. In a recorder, a marking device comprising, in combination, a magnetic core structure, said core structure comprising a first core member having a cylindrical cavity and a second core member positioned adjacent said first core member defining an air gap therebetween, a mechanically independent spherical marking element movably positioned in said cavity, only said marking element being positioned within said cavity, means for positioning a recording medium adjacent said marking element, and means for selectively moving said marking element into marking contact with said recording medium, said moving means comprising means for selectively inducing a magnetic flux in said core structure.

3. In a recorder, a marking device comprising, in combination, a magnetic core structure, said core structure comprising a first core member having a central cylindrical cavity and a second core member positioned adjacent said first core member to define an air gap therebetween, a mechanically independent spherical marking element movably positioned in said cavity, only said marking element being within said cavity, means inducing magnetic flux into said core structure, said flux passing through said marking element in traversing said gap, means for positioning a recording medium adjacent said marking element, means for establishing a space-time relationship between said recording medium and said marking element, and means for selectively impressing said marking element on said recording medium within said space-time relationship.

4. The combination defined in claim 3 wherein said flux in traversing said gap is presented the least reluctance by a path including said marking element.

5. In a recorder, a marking device comprising, in combination, a magnetic core structure, said core structure comprising a first core member having a central cylindrical cavity and a second core member positioned proximate to said first core member so as to define a first air gap therebetween, a mechanically independent spherical marking element movably positioned in said cavity so as to define a second air gap between said marking element and a wall of said cavity, said marking element protruding into said first air gap toward said second core member so as to define a third air gap between said marking element and said second core member, means for inducing magnetic flux into said core structure, said first air gap defining a flux path presenting greater reluctance than the flux path defined by a combination of said second air gap, said marking element and said third air gap, means for positioning a recording medium adjacent said marking element, means for establishing a space-time relationship between said recording medium and said marking element, and means for selectively impressing said marking element on said recording medium within said space-time relationship causing a record to be made thereon.

6. In a recorder, a marking device comprising, in combination, a magnetic core structure, said core structure comprising a first core member having a cavity and a second core member positioned adjacent said first core member defining an air gap therebetween, a mechanically independent spherical marking element movably positioned and freely rotatable in said cavity, only said marking element being within said cavity, means for positioning a recording medium adjacent said marking element, and means for selectively moving said marking element into marking contact with said recording medium, said moving means comprising means for selectively inducing a magnetic flux in said core structure.

7. The combination described in claim 6, in combination with means for maintaining said marking element in contact with said recording medium at a predetermined pressure, said moving means exerting a pressure greater than said maintaining means, said maintaining means comprising means for inducing a magnetic flux into said core structure.

8. In a recorder, a marking device comprising, in combination, a magnetic core structure, said core structure comprising a first core member having a cavity and a second core member positioned adjacent said first core member defining an air gap therebetween, a mechanically independent marking element of circular cross section movably positioned and freely rotatable in said cavity, means for positioning a recording medium to define a plane parallel to the axis of rotation of said marking element, and means for selectively moving said marking element into marking contact with said recording medium, said last named means comprising means for selectively inducing a magnetic flux in said core structure.

9. In a recorder, the combination in accordance with claim 8 wherein said means for selectively inducing a magnetic flux in said core structure includes winding means positioned only in said second core member.

References Cited in the file of this patent

UNITED STATES PATENTS

| | | |
|---|---|---|
| 1,933,792 | Dalton | Nov. 7, 1933 |
| 2,066,261 | Finch | Dec. 29, 1936 |
| 2,359,617 | Bryce | Oct. 3, 1944 |
| 2,785,039 | Artzt | Mar. 12, 1957 |

OTHER REFERENCES

Pexton et al.: IBM Technical Disclosure Bulletin, vol. 1, No. 1, June 1958.